United States Patent
Efstathiou

(10) Patent No.: US 7,248,646 B1
(45) Date of Patent: Jul. 24, 2007

(54) DIGITAL RECONFIGURABLE CORE FOR MULTI-MODE BASE-BAND TRANSMITTER

(75) Inventor: Dimitrios Efstathiou, Greensboro, NC (US)

(73) Assignee: Analog Devices Inc., Norwood, MA (US)

( * ) Notice: Subject to any disclaimer, the term of this patent is extended or adjusted under 35 U.S.C. 154(b) by 790 days.

(21) Appl. No.: 10/126,258

(22) Filed: Apr. 19, 2002

(51) Int. Cl.
*H04L 27/20* (2006.01)
*H03K 5/159* (2006.01)

(52) U.S. Cl. ................................ 375/308; 375/232
(58) Field of Classification Search ............... 375/230, 375/283, 308, 350, 229, 232, 295, 296; 332/103; 708/300, 322, 323
See application file for complete search history.

(56) References Cited

U.S. PATENT DOCUMENTS

| | | | |
|---|---|---|---|
| 4,757,519 A * | 7/1988 | Collison et al. ............. 375/296 |
| 5,253,271 A * | 10/1993 | Montgomery ............... 375/295 |
| 5,369,378 A | 11/1994 | Kosaka et al. |
| 5,502,735 A * | 3/1996 | Cooper ........................ 375/229 |
| 5,528,631 A * | 6/1996 | Hayashi et al. .............. 375/283 |
| 5,546,431 A * | 8/1996 | Bazes ........................... 375/350 |
| 5,604,770 A | 2/1997 | Fetz |
| 5,937,010 A * | 8/1999 | Petranovich et al. ........ 375/295 |
| 6,075,827 A | 6/2000 | Shida et al. |
| 6,091,765 A * | 7/2000 | Pietzold et al. ............. 375/219 |
| 6,194,977 B1 * | 2/2001 | Wang .......................... 332/103 |
| 6,697,438 B2 * | 2/2004 | Doetsch et al. ............. 375/316 |
| 6,707,848 B2 * | 3/2004 | Agazzi et al. .............. 375/229 |
| 2002/0159551 A1 * | 10/2002 | Ekvetchavit et al. ....... 375/350 |

OTHER PUBLICATIONS

"π/4-DQPSK Data-Modulation Schemes Help Enable 3G Systems" by Dimitrios Efstathiou; Wireless Systems Design, Jan. 1999; pp. 27-32.

* cited by examiner

*Primary Examiner*—Betsy L. Deppe
(74) *Attorney, Agent, or Firm*—Gauthier & Connors LLP

(57) ABSTRACT

A reconfigurable communication transmitter core includes a digital pulse-shaping filter to perform pulse-shaping operations upon a digital modulated signal and a finite state machine to controls operation and reconfiguration of the digital pulse-shaping filter. A first memory stores coefficients and a second memory stores data. A multiplier multiplies a data value stored in the second memory with a corresponding coefficient value stored in the first memory. An adder adds each multiplication product from the multiplier with the content of an accumulation register wherein the accumulation register accumulates the sum from the adder. A rounding unit rounds off the content of the accumulation register and to provide rounded-off content as an output of the reconfigurable communication transmitter core. The finite state machine reconfigures a look-up table value set in the first memory, the first memory having pre-stored therein pulse shaped filtered waveforms. The pulse shaped filtered waveform having been pre-calculated.

4 Claims, 10 Drawing Sheets

DIGITAL RECONFIGURABLE CORE FOR MULTI-MODE BASE-BAND TRANSMITTER

FIELD OF THE PRESENT INVENTION

The present invention relates to digital communication systems, and in particular, to a digital pulse-shaping filter for a radio transmitter.

BACKGROUND OF THE PRESENT INVENTION

In conventional multiple-channel radio transmitters, a transmission signal is distributed over a broad transmission bandwidth, which is in turn divided into a plurality of sub-bands, referred to as "channels". The channels are configured in a bank, each sub-band channel in the bank having a dedicated transmitter tuned exclusively to the sub-band of that specific channel. Each of the transmitters requires a significant degree of power, and each is bulky in size and is expensive to produce. This form of redundant architecture results in a large number of dedicated transmitters located at a base station. Not only is this type of dedicated channel architecture expensive, but each channel is also custom-built for a given air interface/modulation standard, and tuned for a given channel setting. It is therefore difficult or impossible to adapt a given channel for use in an environment having different transmission parameters.

Recent developments in digital signal processing (DSP) and data conversion have provided more efficient architectures radio transmitter designs. In the field of wireless base stations for example, wide-band transmitters have conferred significant benefits, including reductions in base station cost, size, complexity, and power consumption.

With reference to FIG. 1, in a wide-band transmitter 20, a plurality of DSP circuits 22 process the signals of a number of individual channels $Ch_1$, $Ch_2$, ... $Ch_L$. Each channel transports information from a number of users. The channels are base-band filtered in order to band-limit the transmitted signal and to provide needed suppression outside the band of interest so as to avoid interference with adjacent channels. Base-band filtering can optionally be combined with an interpolation technique for improving the performance of a transmitter.

The digital base-band signals 23 are next input to a plurality of digital tuners 24, each tuner 24 filters and/or interpolates the digital base-band signal 23. The tuner mixes, or "up-converts", the wide-band, interpolated signal to an intermediate frequency (IF), and a plurality of signals are combined. The wide-band digital signal 25 is next converted to an analog signal 27 by means of a digital-to-analog converter 26. The resulting analog signal 27 is band-shifted to a radio frequency (RF) at RF up-converter 28, and amplified by means of a power amplifier 30 and transmitted through an antenna 32.

While the conventional transmitter of FIG. 1 represents an improvement over prior techniques, its design is still limited in that it requires dedicated pre-programmed filters that are not readily modifiable to different channel parameters or modulation protocols or interface standards.

Therefore, in view of the limitations discussed above, it is desirable for a transmitter to be configured to operate as a conventional digital Finite Impulse Response (FIR) or Infinite Impulse Response (IIR) filter and to provide, through pulse-shaped filtering, pulse-shaped data samples at its output. It is further desired that a wide-band digital transmitter system be flexible so that it is simultaneously supportive of a variety of air interface/modulation techniques and protocols (e.g., AMPS, IS-136, GSM, EDGE, etc.), as well as being switchable between protocols whenever required.

SUMMARY OF THE PRESENT INVENTION

One aspect of the present invention is a reconfigurable communication transmitter core. The reconfigurable communication transmitter core includes a digital pulse-shaping filter to perform pulse-shaping operations upon a digital modulated signal and a finite state machine to controls operation and reconfiguration of the digital pulse-shaping filter.

Another aspect of the present invention is a reconfigurable communication transmitter core. The reconfigurable communication transmitter core includes a $\pi/4$ DQPSK phase encoder to encode parallel data to $\pi/4$-DQPSK symbols; a first address generation circuit receiving the $\pi/4$-DQPSK symbols to generate a first address; a first memory, operatively connected to the first address generation circuit, to store, as a data element, an index of a set of four memory locations; a second address generation circuit, receiving the index from the first memory, to generate a second address; a second memory, operatively connected to the second address generation circuit, to store, as a data element, a pair of pre-determined pulse shaped filtered waveforms; and a post memory processing circuit, operatively connected to the second memory, to provide pulse-shaped values, corresponding to a received pair of pre-determined pulse shaped filtered waveforms, for each channel, a real channel and an imaginary channel.

A third aspect of the present invention is a method for designing a reconfigurable communication transmitter core. The method defines a fundamental core structure on which the reconfigurable communication transmitter core will be hosted; defines a set of system parameters specifying operational and physical constrains of the defined fundamental core structure; and selects between finite state machine design complexity and core reconfiguration flexibility based on individual system parameters.

A fourth aspect of the present invention is a method of designing a reconfigurable communication transmitter core having a pulse shaping filter, the pulse shape filter including a look-up table having pre-stored therein pre-determined pulse shaped filtered waveforms. The method selects a set of system parameters to control reconfiguration of the communication transmitter core and to control the look-up table implementation of the pulse-shaping filter; and establishes boundaries of multi-mode operation of the reconfigurable communication transmitter core and of flexibility of the reconfigurable communication transmitter core.

BRIEF DESCRIPTION OF THE DRAWINGS

The present invention may take form in various components and arrangements of components, and in various steps and arrangements of steps in which like reference characters refer to the same parts throughout the different views. The drawings are only for purposes of illustrating a preferred embodiment and are not to be construed as limiting the present invention, wherein.

DETAILED DESCRIPTION OF THE PRESENT INVENTION

As noted above, it is desirable for a transmitter to be configured to operate as a conventional digital Finite Impulse Response (FIR) or Infinite Impulse Response (IIR) filter and to provide, through pulse-shaped filtering, pulse-shaped data samples at its output. Pulse-shaped filtering is employed in order to band-limit a transmitted signal and is important in improving transmitter performance. A family of pulse-shaping filters that meets the Nyquist criterion and commonly used in communication systems is the raised cosine family having a transfer function H(jω):

$$|H(j\omega)| = \begin{cases} 1 & 0 \le \omega < \pi z(1-a)/Ts \\ \cos^2(Ts/4a(\omega - (\pi(1-a))/Ts) & \pi(1-a)/Ts \le \omega < \pi(1+a)/Ts \\ 0 & \omega \ge \pi(1+a)/Ts \end{cases}$$

where α(0, . . . , 1) is the roll-off factor of a raised cosine filter.

Traditionally, base-band pulse-shaping filtering was implemented using discrete analog components. In the past decade however, there has been a migration toward digital implementations of base-band pulse-shaping filters.

Digital filters are easier to implement and can be programmable, for example, using sets of filter coefficients. Further, the impulse response of the digital filter in the In-Phase channel is identical to the impulse response of the digital filter in the Quadrature channel. Thus, the digital base-band pulse-shaping filters provide a significant advantage over analog base-band pulse-shaping filters, which suffer from In-Phase and Quadrature channel mismatch.

Digital filtering in base-band communication transmitters can be implemented using Finite Impulse Response (FIR) or Infinite Impulse Response (IIR) systems. The most common implementation for base-band pulse-shaping filtering is the Finite Impulse Response (FIR) digital filter.

Although the below exemplary discussion of the concepts of the present invention is focused upon a Finite Impulse Response pulse-shaping filter, these concepts of the present invention are equally applicable to an Infinite Impulse Response filter.

Pulse-shape filtering involves convolution of the input data with the impulse response of the filter. It is a computationally intense process that requires many digital multiplication processes and significant power consumption.

The proposed reconfigurable processor core of the present invention results in a faster modulator and provides flexibility for high-data-rate communication systems. The configuration is optimized for dynamic rate transmission, thereby enabling a common hardware platform for voice, video, and data applications. The core is applicable for deployment at both base stations and user equipment, resulting in decreased product cost. All prevalent modulation protocols (π/4 DQPSK, GMSK, QPSK, 3π/8 8-PSK) used in the majority of existing communication systems can be accommodated by utilizing the concepts of the present invention.

Figure 1:
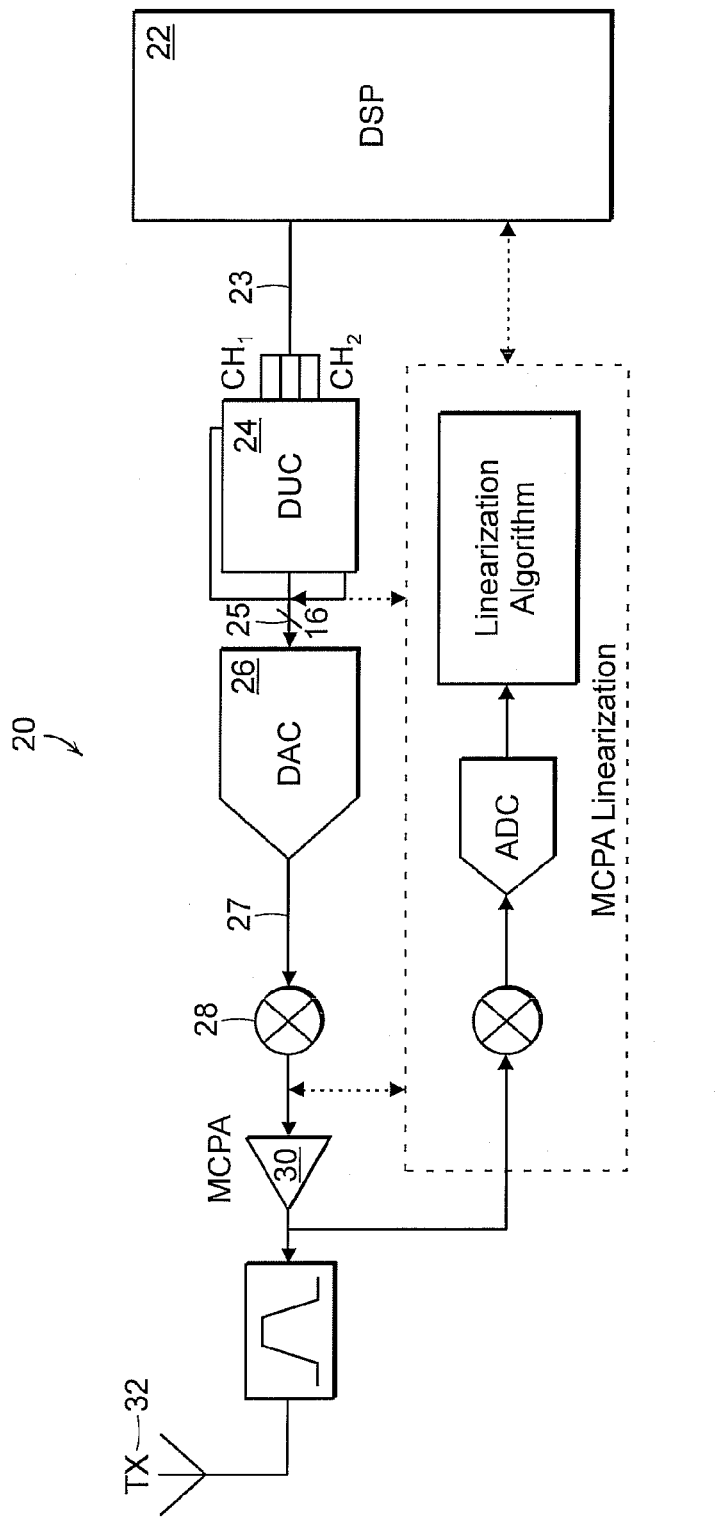
FIG. 1 is a block diagram showing a conventional communication transmitter having a single or multiple sub-band transmitters.
Figure 2:
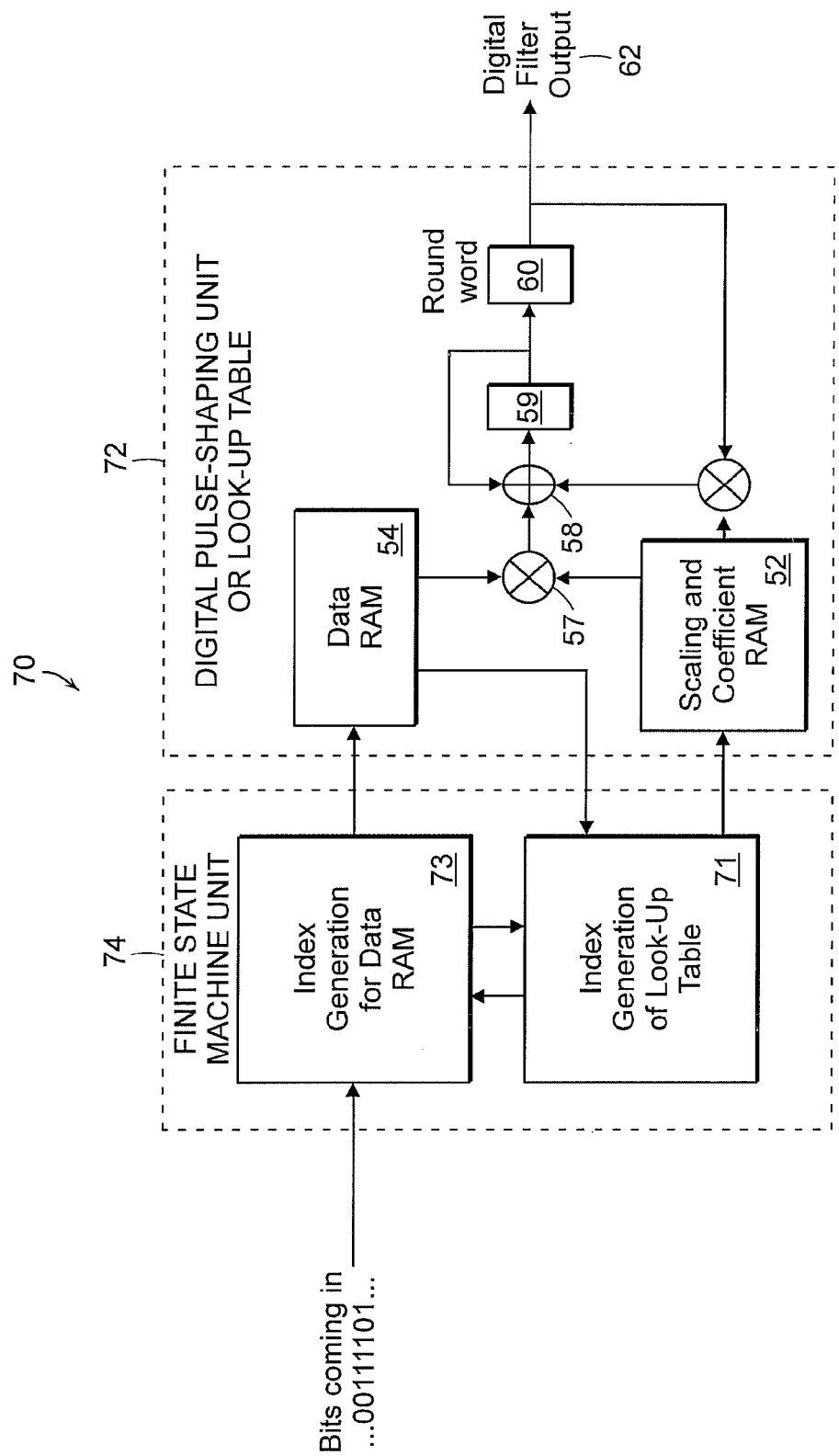
FIG. 2 is a block diagram showing a reconfigurable pulse-shaping filter core in accordance with the concepts of the present invention.

FIG. 2 illustrates, according to the concepts of the present invention, an exemplary reconfigurable communication transmitter core 70 that includes a digital filter unit 72, either of the Finite Impulse Response (FIR) or Infinite Impulse Response (IIR) type, as described above, and a control unit 74 that controls the operation and reconfiguration of the digital filter 72. The digital filter unit 72 is referred to hereinafter as the DPSFU (digital pulse-shaping filter unit) and the control unit 74 as the FSMU (finite state machine unit).

For the purpose of explaining the following example, the reconfigurable core 70 is configured as a standard FIR filter that performs data pulse-shaping. This operation is described mathematically as the convolution of the data samples with the impulse response of a FIR filter:

$$z_k = \sum_i c_i \cdot v_{i-k} \qquad (2)$$

where $Z_k$ is the output 62 of the FIR filter 72, $c_i$ are the filter coefficients (or filter impulse response) and vi are the input data samples.

The FIR digital filter 72 can be implemented in hardware, as described above. The FIR digital filter 72 can also optionally be implemented via software using a general-purpose digital signal processor (DSP) having the multiply and accumulate (MAC) instruction performed in a nested loop.

The FIR filter 72 includes two memory blocks, a first memory 52 for storing coefficients and a second memory 54 for storing data. A multiplier 57 multiplies a data value stored in the second memory 54 with a corresponding coefficient value stored in the first memory 52. Each multiplication product from multiplier 57 is added, at an adder 58, to the content of an accumulator register 59. This process is iteratively repeated and the resulting value of the register 59 is rounded off at rounding unit 60 and provided as the output 62 of the FIR filter 70.

The output of a FIR filter performing pulse-shaping on a digital modulated signal (e.g., QPSK, GMSK modulation schemes) takes values from a finite set of values. The size of the set of output values depends on air-interface parameters, such as modulation scheme, impulse response length of the filter in the time domain, desired interpolation in the digital filter, and digital filter input data rate. With such a defined set of possible output values, the pulse-shaping filter can be implemented as a look-up table.

In the look-up table configuration of the present invention, pulse-shaping filter output values are pre-calculated offline, and stored in the coefficient memory 52, as shown in FIG. 2. A finite state machine unit 74, for example implemented in hardware or software, controls look up table reconfiguration according to the system parameters (modulation technique, impulse response length of the digital filter, filter interpolation, and digital filter input data rate).

In the example given in FIG. 2, the finite state machine unit 74 is used to reconfigure the look-up table value set in coefficient memory CRAM block 52. The input data bits define a certain signal pattern history that is converted to a particular memory index in a first memory block (data RAM or DRAM) 54 by the indexer address generation block 73 in the finite state machine unit 74.

The data content of the data RAM 54 associated with that index value is in turn linked to a location in the second memory coefficient RAM 52, and a new index value is generated in the address generation block 71 of the finite state machine unit 74. This new address is used to access a memory location of the coefficient RAM 54 that holds the output of an equivalent pulse shaped filtered waveform at the output of an FIR filter. Blocks 71 and 73 will be described in a greater detail below.

Figure 3:
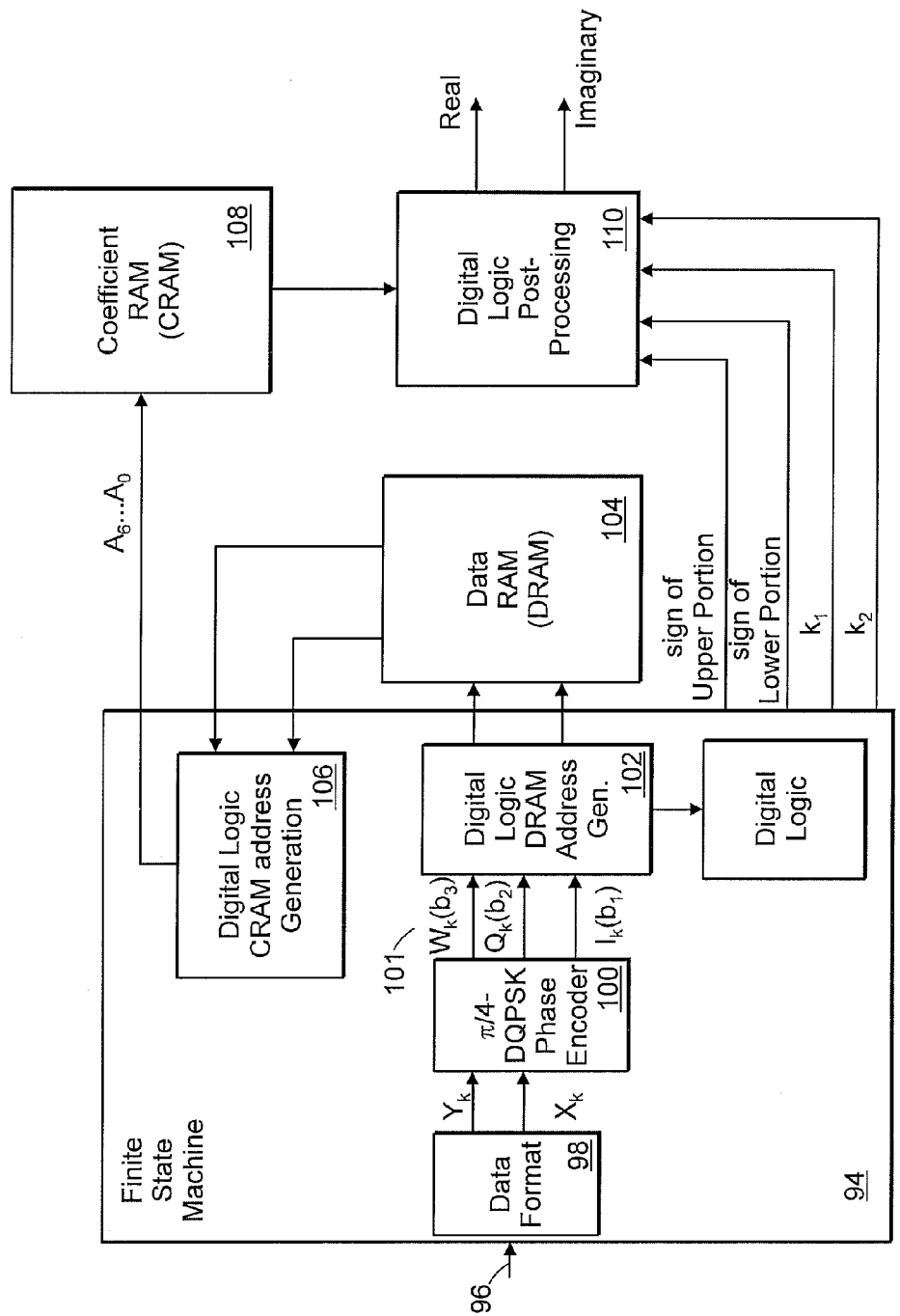
FIG. 3 is a block diagram showing a preferred embodiment of a π/4-DQPSK pulse shaping system configured as a lookup table in accordance with the concepts of the present invention.

An example of a reconfigurable pulse-shaping filter core using π/4-DQPSK type modulation is illustrated in FIG. 3. The exemplary core can be implemented using existing or emerging silicon processes. As explained above, a finite state machine unit (FSMU) drives the look-up table implementation of pulse-shaping filters for the π/4-DQPSK modulator. The exemplary embodiment provides a relatively compact hardware configuration applicable, for example, to use in both base station transmitter stations and user equipment.

With reference to FIG. 3, the exemplary π/4-DQPSK type modulation system 90 takes the form of a transmitter digital signal processor, comprising a π/4 DQPSK phase encoder 100, an address generation digital logic 102, a first memory block (DRAM) 104, address generation digital logic 106, a second memory block (CRAM) 108, and CRAM memory post processing block 110. In this configuration, the pulse-shaping filter is implemented as a look-up table.

Returning to FIG. 3, all possible output waveforms of an equivalent FIR pulse-shaping filter are pre-calculated offline and stored in the second memory 108. During processing, the input data bits at the input 96 (stored in the registers shown in FIG. 5) of the pulse-shape filter contain a certain signal pattern history. This signal pattern, for example with a size of 6 dibits (6 bits for $X_k$ and 6 bits for $Y_k$), drives a finite state machine unit 94. The dibit ($X_k$, $Y_k$) is the complex base-band signal (bits) following processing by the phase encoder 100 (a detailed description is provided below).

Input serial data stream 96 is converted to parallel data at data formatting unit 98. Dibits ($X_k$, $Y_k$) at the output of the data formatting unit 98 are encoded to π/4-DQPSK symbols 101 at the phase encoder 100. The π/4-DQPSK phase encoded symbols 101 4 are used to create the address of an index of a DRAM memory location 104 that stores, as data element, the index of a set of four memory locations in a second memory block CRAM 108. CRAM 108 stores two pairs of data values ((LUT($I_{UPPER}$), LUT($I_{LOWER}$)), (LUT($Q_{UPPER}$), LUT($Q_{LOWER}$))) that are processed by a post-processing block 110 in order to provide pulse-shaped values for both the Real and Imaginary channels. The values of the composed signal waveform are substantially equivalent to the waveform values of a conventional pulse shaping FIR filter.

Figure 4:
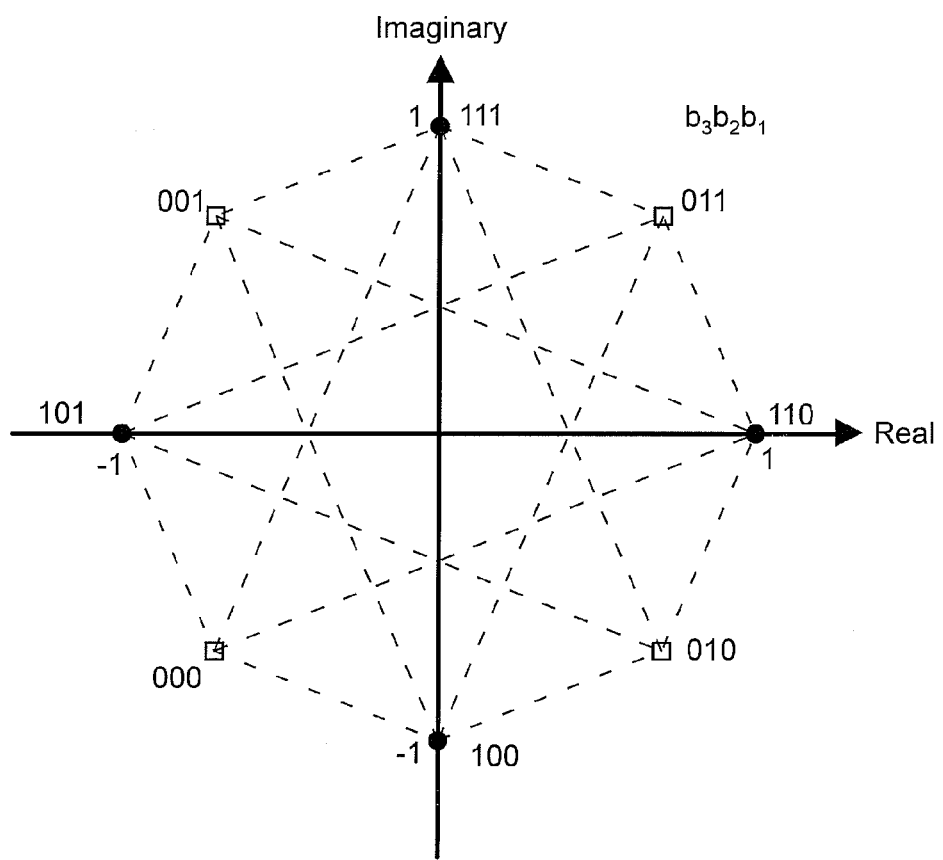
FIG. 4 is a chart of a π/4-DQPSK constellation in accordance with the present invention.

With reference to FIG. 4, the operation of the π/4-DQPSK phase encoder will now be described. The π/4 DQPSK constellation shown in FIG. 4 is viewed as a first QPSK constellation and a second QPSK constellation that is 45° (π/4) rotated version of a first constellation. The π/4-DQPSK constellation points of FIG. 4 are viewed as two independent QPSK constellations, denoted as constellation 1 (black dots) and constellation 0 (white squares). If the $(k-1)^{th}$ π/4-DQPSK transmitted symbol is a dark dot, the $k^{th}$ π/4-DQPSK transmitted symbol will be a white square. If the $(k-1)^{th}$ π/4-DQPSK transmitted symbol is a white square, the $k^{th}$ π/4-DQPSK transmitted symbol will be a dark dot.

It may be defined, for example, that the dots of the π/4-DQPSK constellation correspond to QPSK constellation 1 (Real Imaginary values taken from set (1, 0), (0, 1), (−1, 0) (0, −1)), while the squares in the π/4-DQPSK constellation correspond to QPSK constellation 0 (Real Imaginary values taken from set (0.707, 0.707), (−0.707, 0.707), (−0.707, −0.707), (0.707, −0.707)). In Table 1 below, bits $b_3$, $b_2$, $b_1$ correspond to bits $b_3b_2b_1$ of FIG. 4.

A stream of bits of 1's and 0's come into the π/4-DQPSK type modulation system 90 and are grouped in sets of two bits ($X_k$, $Y_k$). A set of two bits is encoded to a set of three bits $b_3b_2b_1$, (or $W_k$, $Q_k$, $I_k$) with $b_3$ (or $W_k$) being the most significant bit (MSB) and $b_1$ (or $I_k$) being the least significant bit (LSB). The π/4-DQPSK phase encoder block 100 has a dibit ($X_k$, $Y_k$) and a CLOCK signal. The π/4-DQPSK phase encoder block 100 further provides a set of three bits at its output corresponding to π/4-DQPSK constellation point. With this in mind, each of the eight constellation points of π/4-DQPSK constellation corresponds to a set of three bits. An observation can be made in Table 1. Bit $b_3$ denotes that a constellation point is part of QPSK constellation 1 ($b_3=W_k=1$) or QPSK constellation 0 ($b_3=W_k=0$)

TABLE 1

π/4-DQPSK constellation values

| $0_n$ | $b_3b_2b_1$ | Constellation $W_k = b_3$ |
|---|---|---|
| −3π/4 | 000 | 0 |
| 3π/4 | 001 | 0 |
| −π/4 | 010 | 0 |
| π/4 | 011 | 0 |
| −π/2 | 100 | 1 |
| −π | 101 | 1 |
| 0 | 110 | 1 |
| π/2 | 111 | 1 |

Figure 5A:
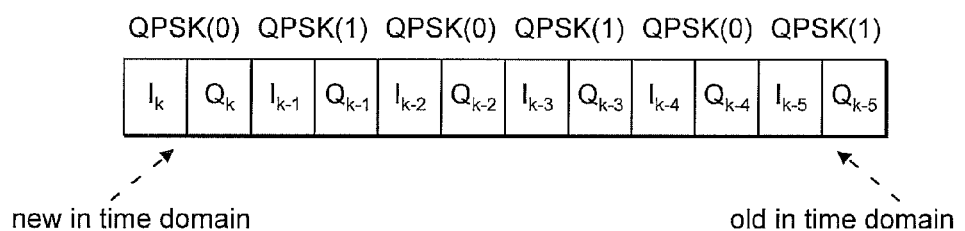
FIG. 5 is an exemplary π/4-DQPSK input data stream in accordance with the concepts of the present invention.
Figure 5B:
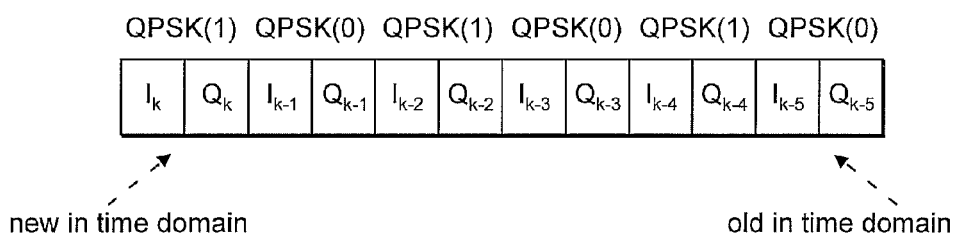

In the following detailed explanation of the finite state machine 94 that drives the look-up table implementation of the π/4-DQPSK filter core example, it is assumed that data bit streams 101 at the output of phase encoder 100 are as shown in FIG. 5.

Figure 7:
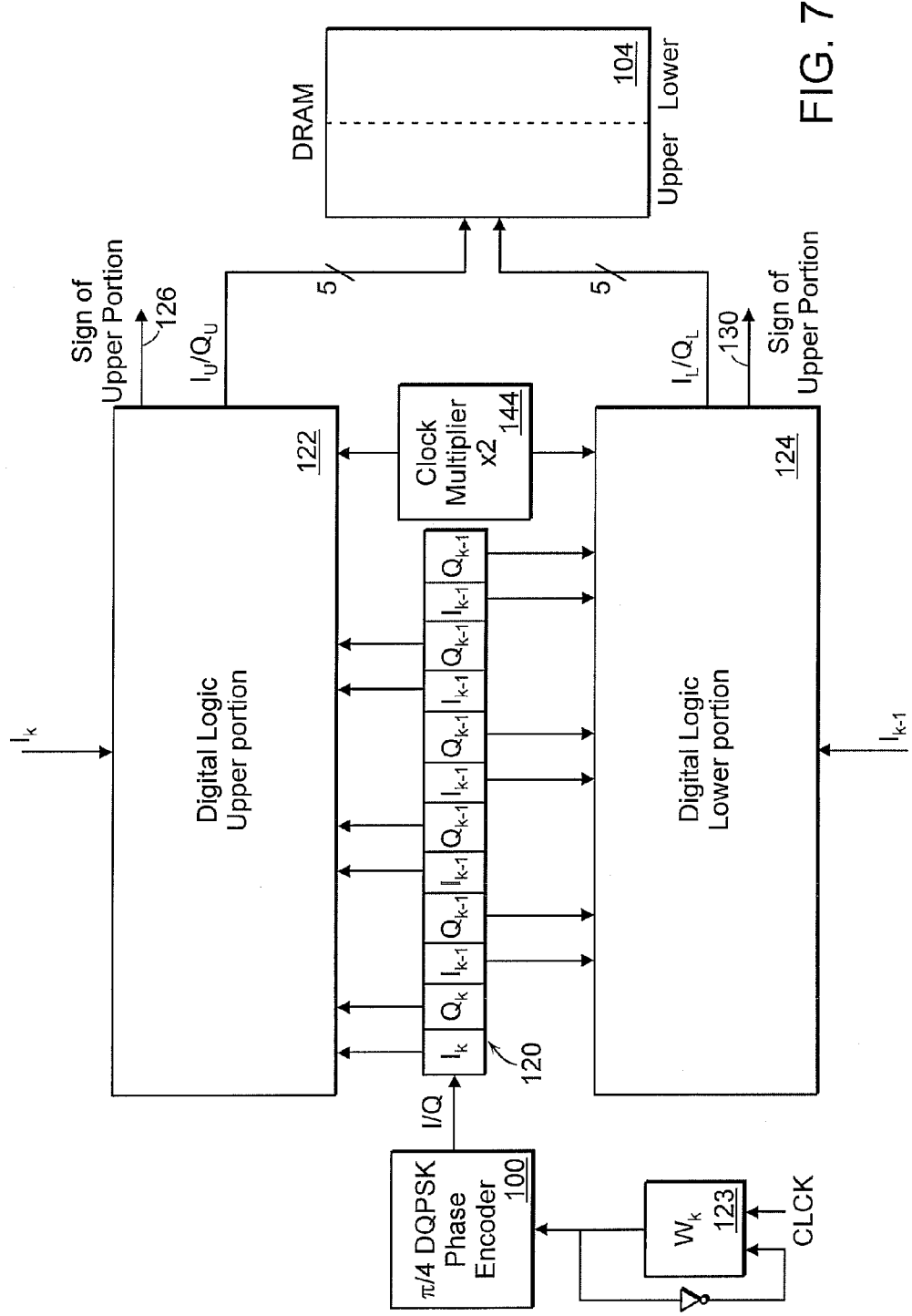
FIG. 7 is a block diagram showing a first memory block (DRAM) index generator (finite state machine) for the embodiment of FIG. 3 in accordance with the concepts of the present invention.

The data register 120 of FIG. 7 is partitioned into two sets of dibits the even-numbered dibits ($I_kQ_k$, $I_{k-2}Q_{k-2}$, $I_{k-4}Q_{k-4}$) and odd-numbered dibits ($I_{k-1}Q_{k-1}$, $I_{k-3}Q_{k-3}$, $I_{k-5}Q_{k-5}$). As the data register 120 length increases, then by necessity, the size of the DRAM and CRAM should also increase. The data register 120 accommodates 6 dibits (12 bits) in this example in order to optimize design complexity and memory size of the look-up table with regard to system performance. The most recent dibit in time (for example $I_k$, $Q_k$) in the data register 120 may be phased encoded to a constellation point of the QPSK constellation 1 ($W_k=1$) or QPSK constellation 0 ($W_k=0$). For this reason, there are dibit sequences as shown in FIG. 5.

Figure 6:
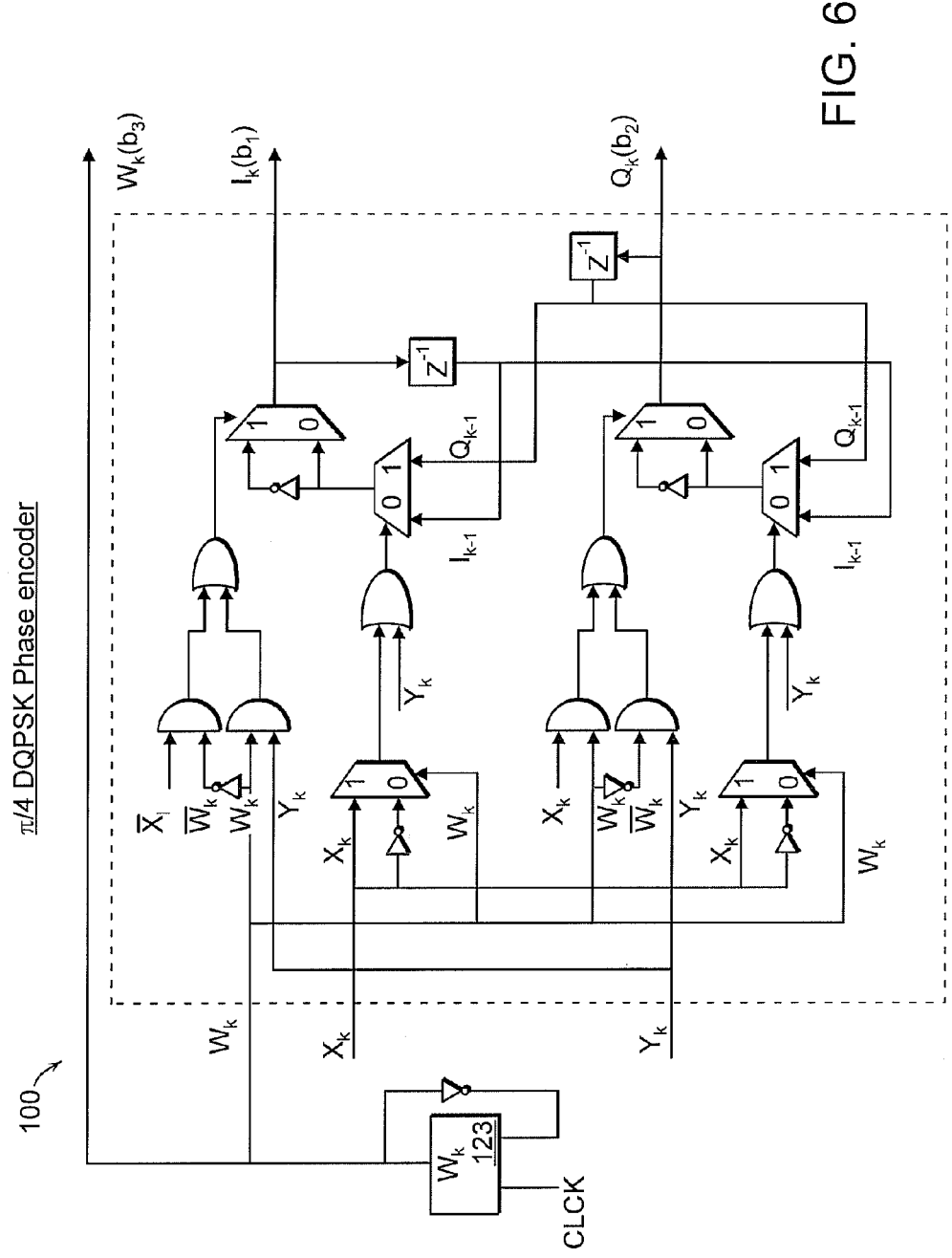
FIG. 6 is a block diagram showing a π/4-DQPSK phase encoder (finite state machine) for the embodiment of FIG. 3 in accordance with the concepts of the present invention.

With reference to FIG. 6, the data register 120 of FIG. 7 is updated when a dibit at the output of the π/4-DQPSK phase encoder 100 is available, in turn clocked by a flip-flop 123. As explained above, the three bits($W_k$, $Q_k$, $I_k$), generated in the phase encoder 100, are synchronized to the clock CLK of the flip-flop 123. Due to the nature of π/4-DQPSK modulation, transmission of a constellation point of QPSK constellation 1 (W=1) is followed by the transmission of a constellation point of a QPSK constellation 0 (W=0) and vice-a-versa.

Bits $I_k$ and $I_{k-1}$ are the two drivers for the DRAM address (index) generation. As shown in FIG. 7, Bit $I_k$ of dibit ($I_k$, $Q_k$) controls the sign bit 126 of the upper portion 122 of the look-up table, and also serves as a select bit for multiplexers 128a, 128b, 128c (FIG. 8).

Figure 9:
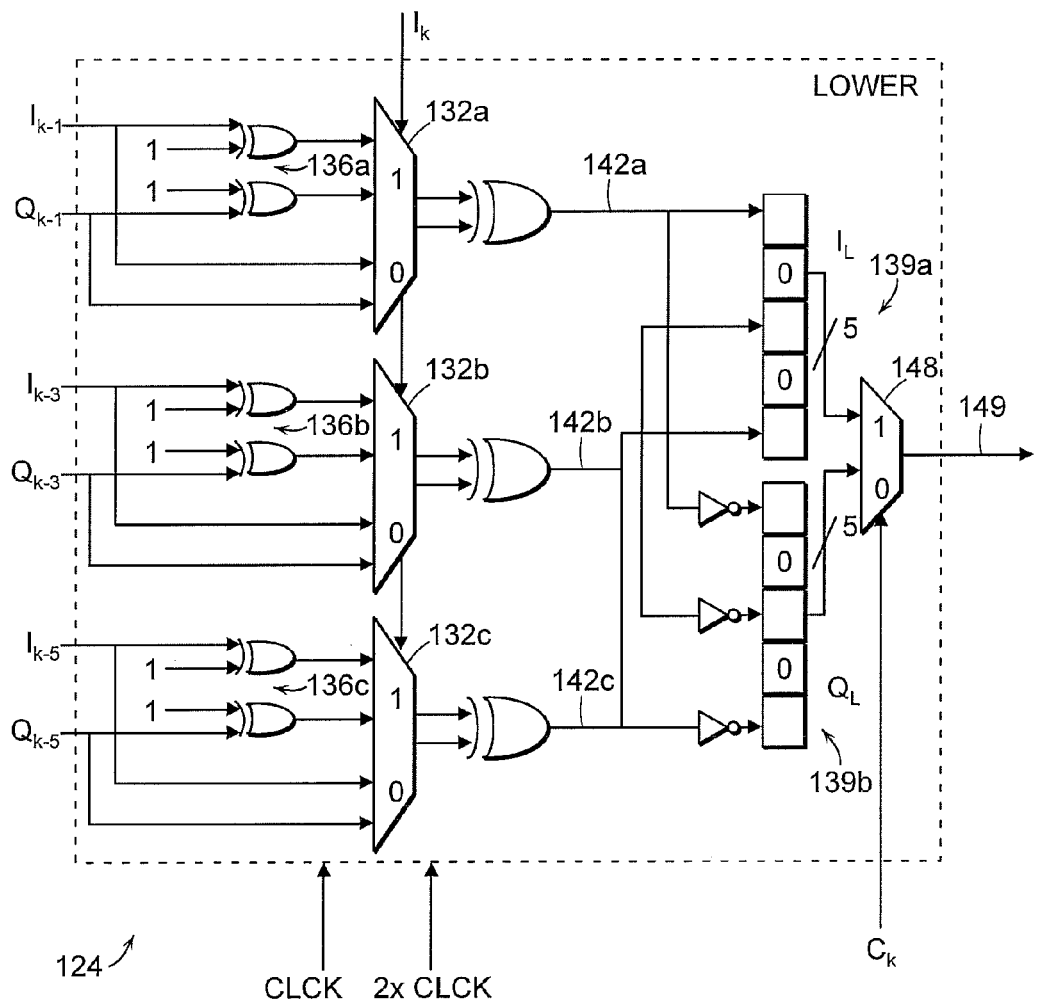
FIG. 9 is a block diagram showing the digital logic for the (lower portion) of a first memory block (DRAM) index address generation for the embodiment of FIG. 7 in accordance with the concepts of the present invention.

Bit $I_{k-1}$ of ($I_{k-1}$, $Q_{k-1}$) controls the sign bit 130 of the lower portion of the look-up table and also serves as a select bit for multiplexers 132a, 132b, 132c (FIG. 9).

Figure 8:
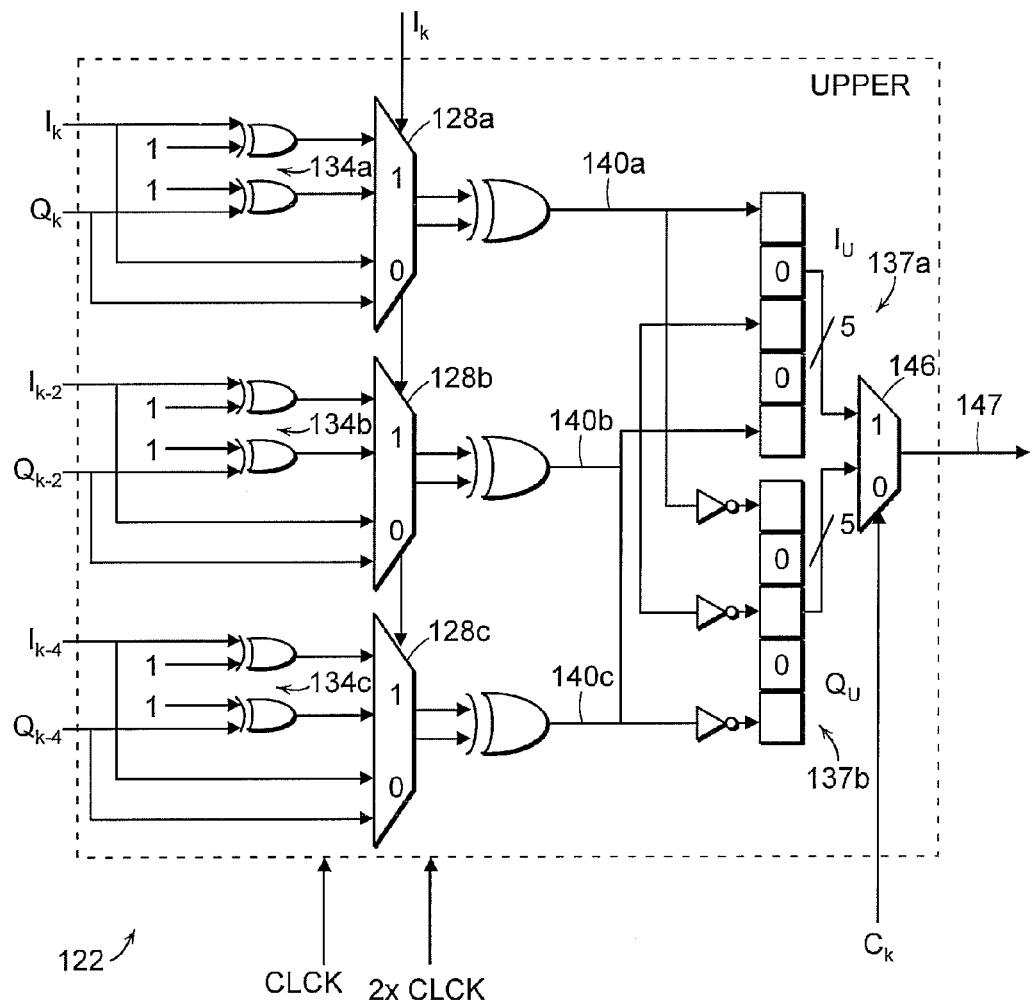
FIG. 8 is a block diagram showing the digital logic for the (upper portion) of a first memory block (DRAM) index generator for the embodiment of FIG. 7 in accordance with the concepts of the present invention.

Each logic element (134a, 134b, 134c, 136a, 136b, 136c) comprises two logical XOR gates, configured as shown in FIG. 8 and FIG. 9, one gate for the $I_k$ bits and one gate for the $Q_k$, bits.

When $I_k=1$ (sign of upper portion 126=1), the respective outputs of multiplexers 128a, 128b, 128c correspond to the output of the logic elements 134a, 134b, 134c. When $I_k=0$ (sign of upper portion 126=0), the respective outputs of the multiplexers 128a, 128b, 128c correspond to the dibits ($I_k$, $Q_k$), ($I_{k-2}$, $Q_{k-2}$), ($I_{k-4}$, $Q_{k-4}$).

Similarly, when $I_{k-1}=1$ (sign of lower portion 130=1), the respective outputs of multiplexers 132a, 132b, 132c correspond to the output of the logic elements 136a, 136b, 136c. When $I_{k-1}=0$ (sign of lower portion 130=0), the respective outputs of the multiplexers 132a, 132b, 132c correspond to the dibits ($I_{k-1}$, $Q_{k-1}$), ($I_{k-3}$, $Q_{k-3}$), ($I_{k-5}$, $Q_{k-5}$).

With reference to Table 2 below, the outputs of XOR gates 140a, 140b, 140c, 142a, 142b, and 142c take values from the two sets ($D_U$, $E_U$) and ($D_L$, $E_L$):

TABLE 2

DRAM Address Generator

| $I_k$ | $Q_k$ | ($I_k$,$Q_k$) XOR (1,1) | $D_U$ | $E_U$ | $D_L$ | $E_L$ |
|---|---|---|---|---|---|---|
| 0 | 0 | NO | 0 | 1 | 0 | 1 |
| 0 | 1 | NO | 1 | 0 | 1 | 0 |
| 1 | 0 | YES | 1 | 0 | 1 | 0 |
| 1 | 1 | YES | 0 | 1 | 0 | 1 |

Multiplexers 128a, 128b, 128c, 132a, 132b, 132c, operate with a 2× clock compared to the input signals of blocks 122 and 124 to generate two index values stored in 137a, 137b in block 122, and 139a, 139b in block 124.

Assuming a first memory block (DRAM) 104, the illustrative embodiment of the present invention uses 14 memory locations of the DRAM memory block. As described above, the first memory block 104 stores index values of the second memory block (CRAM) 108 that contain components of the final constructed output of a pulse-shaping filter. Each memory location in the first memory block (DRAM) 104 is divided into two segments, an upper and a lower segment, corresponding to indices generated from both the upper 122 and lower 124 segments (FIG. 7) of DRAM indexer generator digital logic at the output of the finite state machine 94 (FIG. 3).

A second flip-flop 144 (FIG. 7) controls the outputs of first and second multiplexers 146 (FIG. 8) and 148 (FIG. 9). The second flip-flop 144 operates at a clock rate of 2*CLK, twice as fast as that of the first flip-flop 123.

When the output of the flip-flop 144 is $C_k=1$, multiplexers 146 and 148 output a five-bit word each, 147 and 149 (the five bit value stored in registers 137a (FIG. 8) and 139a (FIG. 9)) that are the indices of a first memory location of DRAM (upper and lower Real channel).

When the output of the flip-flop 144 is $C_k=0$ then multiplexers 146 and 148 output a five-bit word each, 147 and 149 (the five bit value stored in register 137b (FIG. 8) and 139b (FIG. 9)) that are the indices of a first memory location of DRAM (upper and lower Imaginary channel).

Referring to FIG. 3, the address generation digital logic unit 106 generates the index values (addresses) to access the second memory block location 108. A detailed block diagram of the address generation digital logic unit 106 is provided in FIG. 10

Figure 10:
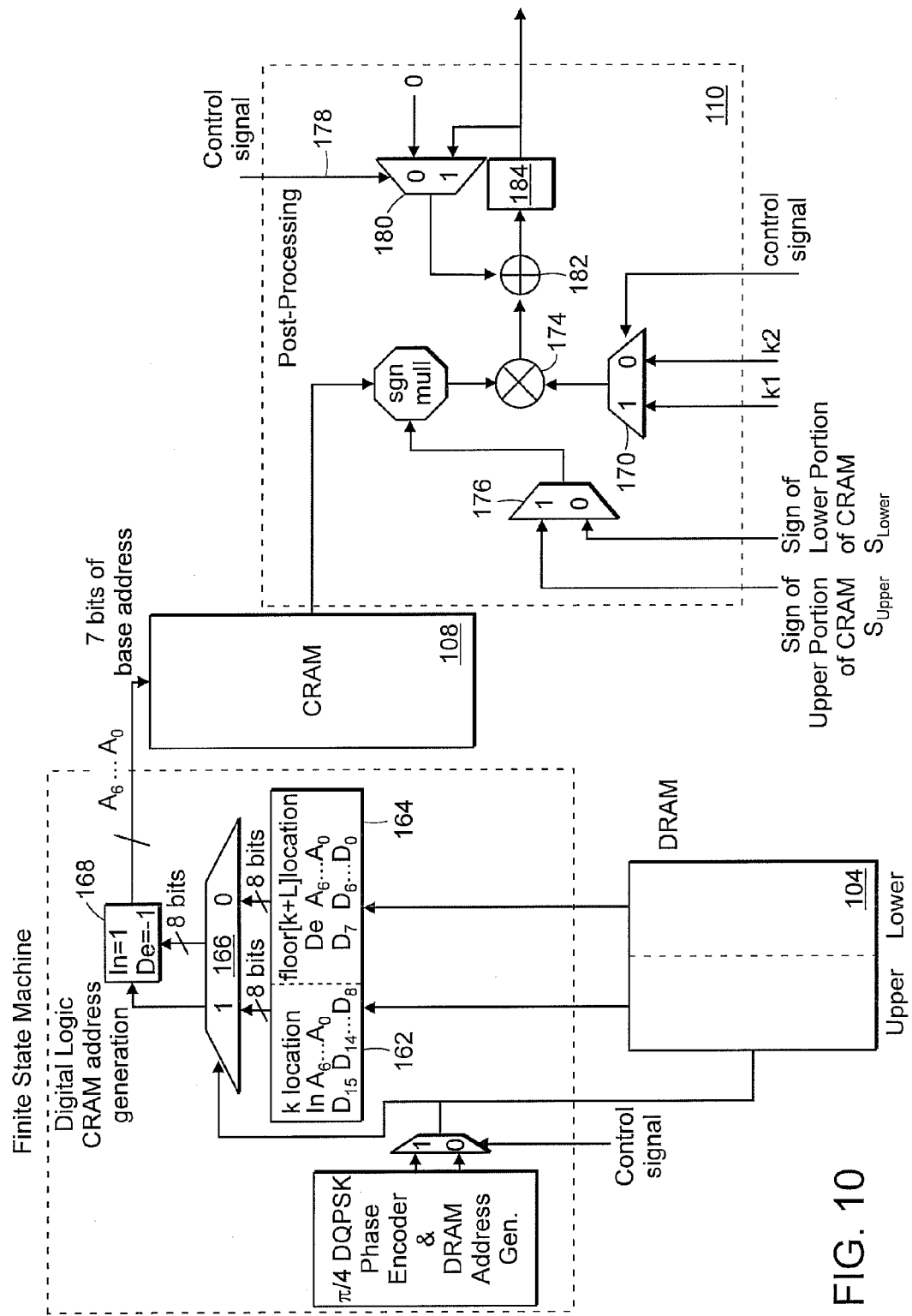
FIG. 10 is a block diagram showing a preferred embodiment of a second memory block (CRAM) index address generation and post processing functions of the FIG. 3 embodiment in accordance with the concepts of the present invention.

As illustrated in FIG. 10, an address register is 16 bits wide and is partitioned into upper (8 bits) and lower (8 bit) segments 162, 164 respectively. The upper segment 162 of the address register ($D_8$, . . . , $D_{15}$) carries the address of the second memory block 108 that stores an index of a set of memory locations In this example, the set consists of four memory locations given that an equivalent FIR filter achieves an interpolation of four (L=4). These four memory locations carry four values (upper portion) of a constructed pulse-shaped waveform.

Similarly, the lower segment 164 of the address register ($D_0$, . . . , $D_7$) carries the address of the second memory block 108 that stores an index of a set memory locations. The set consists of four memory locations given that an equivalent FIR filter achieves an interpolation of four (L=4). These four memory locations carry four values (lower portion) of a constructed pulse-shaped waveform.

Register 168 (increment/decrement) specifies that the second memory block 108 is to be read in increasing or decreasing order for four sequential memory locations. A multiplexer 166 is controlled by the finite state machine 94. When the multiplexer control signal 165 is logical high (1), the address bits $A_0$, . . . , $A_6$ convey the upper segment 162 of the address register. When the multiplexer control signal 165 is logical low (0), the address bits $A_0$, . . . , $A_6$ convey the lower segment 164 of the address register.

In this example, a second memory block 108 has one hundred twenty eight memory locations. Each of them is addressed by a 7-bit address. Referring to Table 3, columns titled Upper and Lower show the 7-bit addresses that are the index values of memory block 108. The two columns titled Increment and Decrement with two bits, one for each of the upper and one for lower segments of the first memory block (DRAM) are provided to specify whether the second memory block 108 is to be read in increasing or decreasing order.

Given the parameters used in this example (FIR filter with data register that accommodates 6 dibits) and exploring various symmetries (with respect both to vertical and horizontal axis) of π/4 DQPSK pulse-shaped values 56 memory locations of the second memory block (CRAM) 108 are used in the present embodiment. The present example assumes a FIR filter of 6 symbols impulse response, and with an interpolation L (e.g. L=4). Constructed Real and Imaginary channel values are effectively equivalent to the output of a FIR pulse-shaping filter having 24 coefficients.

The second memory block 108 outputs two values for each Real and Imaginary channels. The memory block 108 operates at a clock four times faster than the clock that first memory block operates. For every index value of (CRAM) four sets of sequential values are read at the output of the (CRAM) 108. Every set of values consists of an upper and a lower portion. Both upper and lower portions are multiplied by different weighting factors ($k_1$, $k_2$) and are summed in order to provide the pulse-shaping filter value of $\pi/4$-DQPSK. This is achieved in the post-processing block shown in FIG. 10.

Filter Output(Real channel)=$k_1 \cdot LUT(I_{UPPER})+k_2 \cdot LUT(I_{LOWER})$

Filter Output(Imaginary channel)=$k_1 \cdot LUT(Q_{UPPER})+k_2 \cdot LUT(Q_{LOWER})$

TABLE 3

Data RAM values for the first memory block.

| DRAM index value | DRAM upper portion | | DRAM lower portion | |
|---|---|---|---|---|
| $I_U$, $Q_U$, $I_L$, $Q_L$ | Increment | (Upper) | Decrement | (Lower) |
| 010101 | 1 | 0 | 0 | 55 |
| 010110 | 1 | 4 | 0 | 51 |
| 011001 | 1 | 8 | 0 | 47 |
| 011010 | 1 | 12 | 0 | 43 |
| 000000 | 1 | 16 | 0 | 39 |
| 000001 | 1 | 20 | 0 | 35 |
| 000100 | 1 | 24 | 0 | 31 |
| 000101 | 1 | 28 | 0 | 27 |
| 010000 | 1 | 32 | 0 | 23 |
| 010001 | 1 | 36 | 0 | 19 |
| 010100 | 1 | 40 | 0 | 15 |
| 011000 | 1 | 44 | 0 | 11 |
| 010010 | 1 | 48 | 0 | 7 |
| 000110 | 1 | 52 | 0 | 3 |

As explained above, the final constructed FIR filter output, including both Real and Imaginary channels, is the sum of the two weighted portions (Upper and Lower). To accommodate this, initially the control signal 178 at multiplexer 180 is reset to a value of "0" and a value of zero is added at adder 182 to the output of the multiplier 174 (FIG. 10). The result is stored in register 184 and at the next clock cycle is available from the multiplexer 180 by setting the control signal 178 to a "1". The updated output of the multiplier 174 is summed at the adder 182 with the updated output of the multiplexer 180 in order to provide the final constructed programmable filter coefficient output.

Below is an explanation of the weighting factors of the two portions (upper and lower) for each Real and Imaginary channel. Assuming selection signal 170 is set to a logical "1", the output of the second memory block 108 is multiplied at multiplier 174 by $k_1=1$. Assuming selection signal 170 is set to a logical "0", the output of the second memory block 108 is multiplied at multiplier 174 by $k_2=0.70701$. In this manner, the present embodiment takes advantage of inherent symmetries in the $\pi/4$-DQPSK constellation, reducing the memory size required, and increasing overall system efficiency.

The values stored in the second memory block 108 are unsigned values. Multiplexer 176 carries sign information for the two components of the constructed waveform. Assuming $S_{UPPER}$, $S_{LOWER}=1$ the output of the second memory block 108 is multiplied by −1, and if $S_{UPPER}$, $S_{LOWER}=0$ there is no sign change for the output of the second memory block 108.

In summary, the present invention is directed to a method and apparatus for a reconfigurable processing structure with an example of a digital pulse-shaping filter. The present invention provides for a reconfigurable transmitter core that is flexible in its processing steps so as to enable rapid transmitter reconfiguration.

The transmitter can be configured to operate as a conventional digital Finite Impulse Response (FIR) or Infinite Impulse Response (IIR) filter that provides pulse-shaped data samples at its output. The transmitter is optionally configured as a look-up table that provides pulse-shaped data samples at its output. The pulse-shaped data samples are pre-calculated offline and are downloaded to a memory component of the system.

The look-up table can be reconfigured according to application parameters. For example, air-interface standard variety (GSM, IS-95, PDC, IS-136) having different modulation schemes (GMSK, QPSK, $\pi/4$-DQPSK), filter impulse responses, data rate and interpolation rate can all affect the design complexity and constraints of the processor that controls generation of the look-up table.

The present invention uses the selection of a set of system parameters to control the reconfiguration of hardware/software unit that in turn controls the look-up table implementation of the pulse-shaping filter in the communication transmitter. The selected set of system parameters dictates the boundaries of the multi-mode operation and the flexibility of the reconfigurable core. The trade-off between design complexity and flexibility of the proposed structure depends primarily on the number of selected parameters.

The present invention builds on a FIR or IIR filter structure and a finite state machine that controls the reconfiguration of a filter core.

The result is a flexible wide-band digital transmitter system that is simultaneously supportive of a variety of air interface/modulation techniques and protocols (e.g., AMPS, IS-136, GSM, EDGE, etc.), as well as being switchable between protocols whenever required.

In a preferred design method of the reconfigurable core according to the present invention, a preferred first step is the definition of a fundamental core structure on which the reconfigurable core will be hosted, for example an FIR or IIR filter. Next, a set of standard/system parameters specifying operational and physical constrains (or boundaries) of the fundamental structure are defined, for example wireless air-interface parameters as modulation scheme, filter impulse response, filter interpolation and filter input data rate. Next, a decision is made on the trade-off between the finite state machine design complexity and core reconfiguration flexibility. This decision is usually driven by the values of the individual standard/system parameters (e.g. FIR filter interpolation LFIR=2–20, a reconfigurable core accommodating NMOD=5 modulation protocols).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A reconfigurable communication transmitter core, comprising:

a reconfigurable digital pulse-shaping filter to perform pulse-shaping operations upon a digital modulated signal; and a finite state machine to control operation of said digital pulse-shaping filter;

said finite state machine reconfiguring said digital pulse-shaping filter based upon air-interface parameters;

said digital pulse-shaping filter including, a first memory for storing coefficients, a second memory for storing data, a multiplier to multiply a data value stored in said second memory with a corresponding coefficient value stored in said first memory, a register, an adder to add each multiplication product from said multiplier with the content of said register, said register storing the sum from said adder, and a rounding unit, operatively connected to said register, to round-off a content of said register and to provide the rounded-off content as an output of the reconfigurable communication transmitter core;

said finite state machine including, an index generation circuit to convert input data bits defining a certain signal pattern history to a first index value, the first index value being associated with said second memory and linked to an address location in said first memory, and an address generation circuit to generate a second index value associated with said first memory, said second index value enabling access to a memory location in said first memory, each memory location containing an output of an equivalent pulse shaped filtered waveform.

2. The reconfigurable communication transmitter core as claimed in claim 1, wherein said first memory is a look-up table having sets of stored coefficients, each set of coefficients representing pulse-shaping filter output values of a pre-defined distinct digital pulse-shaping filter and said finite state machine selects a set of coefficients in said first memory based upon air-interface parameters so as to reconfigure said digital pulse-shaping filter.

3. The reconfigurable communication transmitter core as claimed in claim 1, wherein said first memory having stored therein pulse shaped filtered waveform values having been calculated offline.

4. A reconfigurable communication transmitter core, comprising:

a reconfigurable digital pulse-shaping filter to perform pulse-shaping operations upon a digital modulated signal;

a finite state machine to control operation and reconfiguration of said digital pulse-shaping filter; and said finite state machine including, a $\pi/4$ DQPSK phase encoder to encode parallel data to $\pi/4$-DQPSK symbols, and a first address generation circuit, receiving the $\pi/4$-DQPSK symbols, to generate a first address;

said reconfigurable digital pulse-shaping filter including a first memory, operatively connected to said first address generation circuit, to store, as a data element, an index of a set of four memory locations;

said finite state machine including a second address generation circuit, receiving said index from said first memory, to generate a second address;

said reconfigurable digital pulse-shaping filter including a second memory, operatively connected to said second address generation circuit, to store sets of two pairs of pre-determined pulse shaped filtered waveforms, each set representing pulse-shaping filter output values of a pre-defined distinct digital pulse-shaping filter;

a post memory processing circuit, operatively connected to said second memory, to provide pulse-shaped values, corresponding to received pairs of pre-determined pulse shaped filtered waveforms, for a real channel and for an imaginary channel;

said finite state machine selecting a set of two pairs of pre-determined pulse shaped filtered waveforms in said second memory based upon air-interface parameters so as to reconfigure said digital pulse-shaping filter.

* * * * *